(12) United States Patent
Champigny (10) Patent No.: US 11,340,942 B2
(45) Date of Patent: May 24, 2022

(54) COOPERATIVE WORK-STEALING SCHEDULER (71) Applicant: Raytheon Company, Waltham, MA (US)

(72) Inventor: Michael Champigny, Portsmouth, RI (US)

(73) Assignee: Raytheon Company, Waltham, MA (US)

(*) Notice: Subject to any disclaimer, the term of this patent is extended or adjusted under 35 U.S.C. 154(b) by 0 days.

(21) Appl. No.: 17/152,021

(22) Filed: Jan. 19, 2021

(65) Prior Publication Data
US 2021/0294648 A1    Sep. 23, 2021

Related U.S. Application Data (60) Provisional application No. 62/991,871, filed on Mar. 19, 2020.

(51) Int. Cl.
    *G06F 9/38*        (2018.01)
    *G06F 9/48*        (2006.01)
    (Continued)

(52) U.S. Cl.
    CPC ........ *G06F 9/4881* (2013.01); *G06F 9/30098* (2013.01); *G06F 9/3836* (2013.01);
    (Continued)

(58) Field of Classification Search
    CPC ... G06F 9/30101; G06F 9/3877; G06F 9/4881
    See application file for complete search history.

(56) References Cited

U.S. PATENT DOCUMENTS

2011/0115802 A1* 5/2011 Mantor ............... G06F 9/5061
                                              345/520
2014/0337587 A1* 11/2014 Hower ................. G06F 9/524
                                              711/154
(Continued)

FOREIGN PATENT DOCUMENTS

EP            3242210 A1     11/2017
WO    WO 2012082557 A2    6/2012

OTHER PUBLICATIONS

Search Report and Written Opinion dated May 26, 2021 for PCT Application No. PCT/US2021/020192; 14 pages.

(Continued)

*Primary Examiner* — Jacob Petranek
(74) *Attorney, Agent, or Firm* — Daly, Crowley, Mofford & Durkee, LLP (57) ABSTRACT

A method for use in a computing system having a central processing unit (CPU) and a graphics processing unit (GPU), the method comprising: assigning a first memory portion and a second memory portion to: a worker thread of a work-stealing scheduler and an execution unit that is part of the GPU; retrieving a task from a queue associated with the worker thread; detecting, by the worker thread, whether a cutoff condition for the task is satisfied; when the cutoff condition is not satisfied, dividing the task into two or more additional tasks and adding the two or more additional tasks to the queue; when the cutoff condition is satisfied, storing first data corresponding to the task in the second memory portion, the first data being stored in the second memory portion by the worker thread; issuing a memory fence acquire instruction; and storing a first value in the first memory portion.

20 Claims, 7 Drawing Sheets

(51) Int. Cl.
*G06F 15/80* (2006.01)
*G06T 1/20* (2006.01)
*G06F 9/30* (2018.01)

(52) U.S. Cl.
CPC ............ *G06F 9/3877* (2013.01); *G06F 15/80* (2013.01); *G06T 1/20* (2013.01)

(56) References Cited

U.S. PATENT DOCUMENTS

| | | | | |
|---|---|---|---|---|
| 2015/0052536 | A1* | 2/2015 | Sah | G06F 9/5083 718/105 |
| 2016/0154677 | A1* | 6/2016 | Barik | G06F 13/4239 718/105 |
| 2017/0004005 | A1* | 1/2017 | Elliott | G06F 9/542 |
| 2017/0068571 | A1* | 3/2017 | Lu | G06F 9/5016 |
| 2018/0364361 | A1* | 12/2018 | Liu | G01S 19/30 |

OTHER PUBLICATIONS

Kumar et al. "Heterogeneous Work-stealing across CPU and DSP cores" University of Texas Instruments, Sep. 15, 2015, 6 pages.
Pinto et al. "Scheduling by Work-Stealing in Hybrid Parallel Architectures" Parallel and Distributed Processing Group, Aug. 17, 2012, 4 pages.

* cited by examiner

┌─────────────────────────────────────────────────────────────────────┐
│ INSTANTIATE A PLURALITY OF QUEUES AND WORKER THREADS OF A WORK-STEALING SCHEDULER │─502
└─────────────────────────────────────────────────────────────────────┘
                                    ▼
┌─────────────────────────────────────────────────────────────────────┐
│ ALLOCATE SHARED MEMORY FOR USE BY THE WORK-STEALING SCHEDULER       │─504
└─────────────────────────────────────────────────────────────────────┘
                                    ▼
┌─────────────────────────────────────────────────────────────────────┐
│ ASSIGN EACH OF THE WORKER THREADS OF THE WORK-STEALING SCHEDULER TO A RESPECTIVE CPU CORE │─506
└─────────────────────────────────────────────────────────────────────┘
                                    ▼
┌─────────────────────────────────────────────────────────────────────┐
│ MAP EACH OF THE WORKER THREADS OF THE WORK-STEALING SCHEDULER TO A DIFFERENT ONE OF THE EXECUTION UNITS │─508
└─────────────────────────────────────────────────────────────────────┘
                                    ▼
┌─────────────────────────────────────────────────────────────────────┐
│ BEGIN EXECUTION OF THE WORKER THREADS OF THE WORK-STEALING SCHEDULER │─510
└─────────────────────────────────────────────────────────────────────┘

RETRIEVE A TASK FROM A QUEUE ─522
                ▼
     IS A CUTOFF CONDITION SATISFIED? ─524
       NO ↙              ↘ YES
┌─────────────────────────┐    ┌─────────────────────────┐
│ DIVIDE THE TASK INTO    │    │ EXECUTE THE TASK BY     │
│ ADDITIONAL TASKS AND ADD│─526│ USING A GPU             │─528
│ THE ADDITIONAL TASKS TO │    │                         │
│ THE QUEUE               │    │                         │
└─────────────────────────┘    └─────────────────────────┘

COOPERATIVE WORK-STEALING SCHEDULER

CROSS REFERENCE TO RELATED APPLICATIONS

This application claims the benefit of U.S. Provisional Application No. 62/991,871, filed on Mar. 19, 2020 under 35 U.S.C. § 119(e) which application is hereby incorporated herein by reference in its entirety.

BACKGROUND

GPU devices are optimized for computational throughput as opposed to response time (i.e., latency). Conventional design choices in the architecture and associated software of GPUs are oriented towards high sustained throughput of arithmetic operations. In particular, GPUs have relatively small and simple caches and software-managed scratchpad memories which maximize chip real-estate for large numbers of arithmetic logic units (ALUs) for the parallel processing of massive data sets. However, the current bulk-synchronous programming model of GPUs limits their applicability to host a flexible application that requires a certain level of task scheduling. Known GPU scheduling policies are defined in hardware and do not allow manual algorithm placement on GPU multi-processors. For example, running an application that requires multi-processor synchronization, such as producer-consumer pattern, on the same multi-processors may lead to a deadlock. In conventional systems it is also difficult to provide an environment for processing tasks where similar tasks could be co-scheduled on the same multi-processor to get benefit from the locality, such as utilizing the local GPU cache better.

The Compute Unified Device Architecture (CUDA) framework from NVIDIA CORP provides an ability to launch cooperative thread grids on a GPU which can be synchronized through a global barrier on the GPU itself (without having to synchronize with a barrier on the CPU). This feature allows the user to schedule a pipeline of kernels (i.e., GPU programs) to the GPU. However, the off-the-shelf GPU scheduler still schedules thread blocks in an undefined way across the entire GPU device which prevents manual placement of thread blocks on GPU multi-processors. This limitation may underutilize the GPU resources.

SUMMARY

According to aspects of the disclosure, a method is provided for use in a computing system having a central processing unit (CPU) and a graphics processing unit (GPU), the method comprising: assigning a first memory portion and a second memory portion to: (i) a worker thread of a work-stealing scheduler that is executed on the CPU and (ii) an execution unit that is part of the GPU; retrieving a task from a queue associated with the worker thread; detecting, by the worker thread, whether a cutoff condition for the task is satisfied; when the cutoff condition is not satisfied, dividing the task into two or more additional tasks and adding the two or more additional tasks to the queue.

According to aspects of the disclosure, a system is provided, comprising: a graphics processing unit (GPU) having an execution unit; a random-access memory having a first memory portion and a second memory portion; a central processing unit (CPU) that is configured to execute a work-stealing scheduler, the work-stealing scheduler having a worker thread that is configured to perform the operations of: retrieving a task from a queue associated with the worker thread; detecting whether a cutoff condition for the task is satisfied; when the cutoff condition is not satisfied, dividing the task into two or more additional tasks and adding the two or more additional tasks to the queue.

According to aspects of the disclosure, a non-transitory computer-readable medium is provided that is configured to store one or more processor executable instructions, which, when processed by at least one processor, cause the processor to execute a work-stealing scheduler having a worker thread, the worker thread being arranged to share a first memory portion and a second memory portion with an execution unit that is part of a graphics processing unit (GPU), the worker thread being arranged to perform the operations of: retrieving a task from a queue associated with the worker thread; detecting whether a cutoff condition for the task is satisfied.

BRIEF DESCRIPTION OF THE DRAWINGS

The foregoing features may be more fully understood from the following description of the drawings in which.

DETAILED DESCRIPTION

Work-stealing is an efficient dynamic scheduling policy widely employed on central processing units (CPUs). A work-stealing scheduler performs load balancing on a parallel processor by distributing tasks across a set of double-ended queues (hereinafter "deque"), each associated with a worker thread running on a processing core. Each deque may support a push and pop operation which allows the local thread associated with that deque to schedule and de-schedule work (i.e., tasks) in the same order as a serial execution (i.e., stack order). Each deque may also support a steal operation which non-local threads (also referred to as thief threads) employ when they have run out of tasks to execute on their local deques. The steal operation may remove a task from the opposite end (relative to the local thread) of a victim's deque for execution by a thief thread. When a task is executed, the execution of the task may frequently generate additional tasks which are then placed on the local deque.

Work-stealing schedulers generate and process tasks which form a directed acyclic graph (DAG) at runtime. They execute algorithms expressed as divide-and-conquer recurrences, where one or more finer-grained child tasks are created (i.e., forked) for each parent task. These algorithms also indicate where a thread must wait (i.e., join) for forked child tasks to finish execution. In the base case of the recurrence (called the sequential cutoff), the task to be divided is too small to be profitably partitioned into child tasks, at which point a sequential algorithm is executed (i.e., a leaf task). Profitability is a measure of how much overhead is needed to partition and schedule child tasks. Notably, all of the algorithmic work is performed in the leaf tasks.

According to the present disclosure, an improved work-stealing scheduler is disclosed in which a CPU executes the portion of the work-stealing scheduler that recursively divides a task until reaching the sequential cutoff where scheduler overhead dominates the cost of actually executing that task. At that point, instead of executing the sequential code on the CPU, the improved work-stealing scheduler offloads the task for execution on an available graphics processing unit (GPU). By way of example, in some implementations, the present disclosure may provide an enhancement to existing work-stealing schedulers (which utilize the CPU only) by presenting a heterogeneous, cooperative work-stealing scheduler design which supports GPUs and maintains the execution semantics of existing general-purpose work-stealing schedulers.

Figure 1:
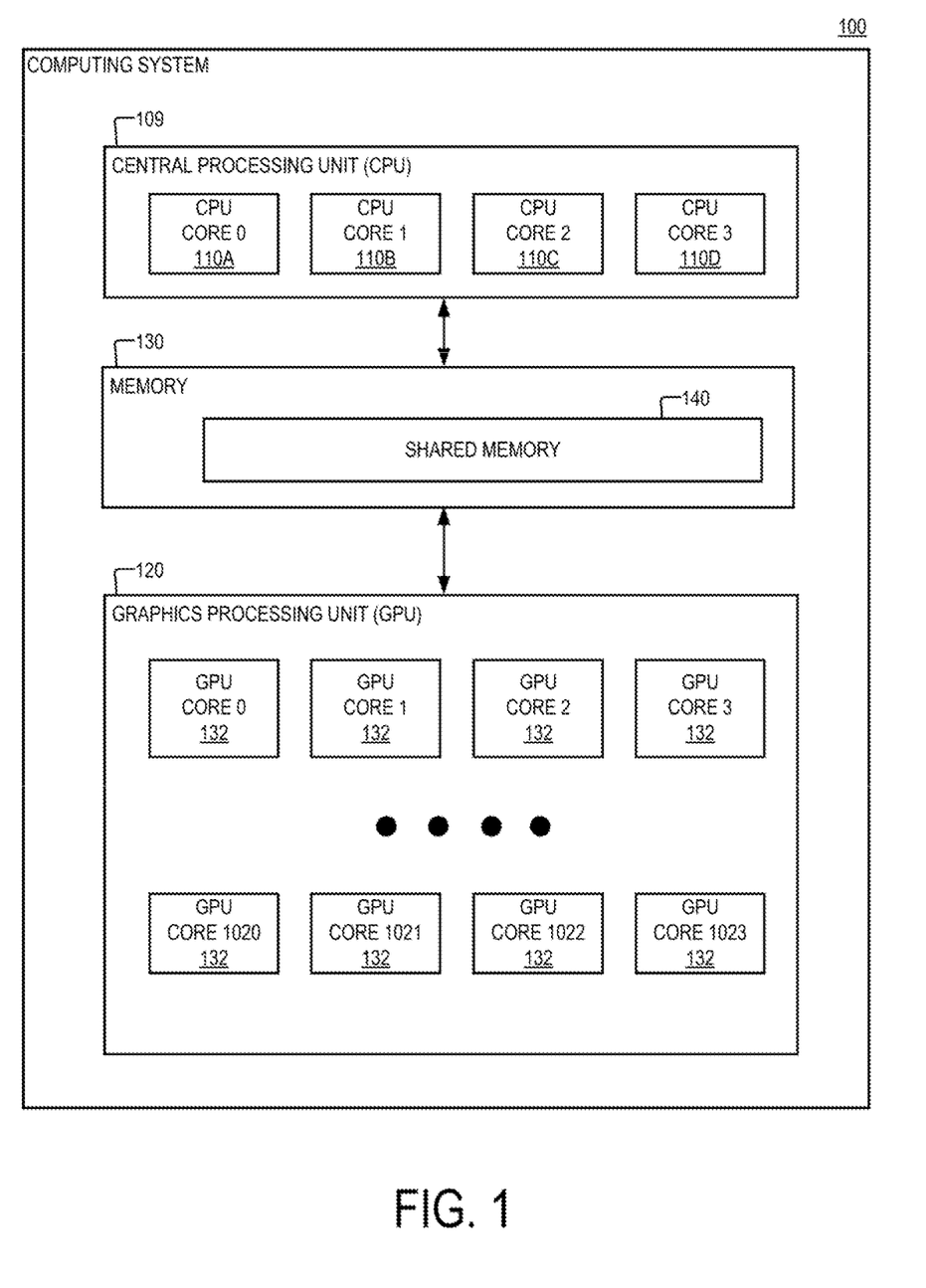
FIG. 1 is a diagram of an example of a computing system, according to aspects of the disclosure.
Figure 2A:
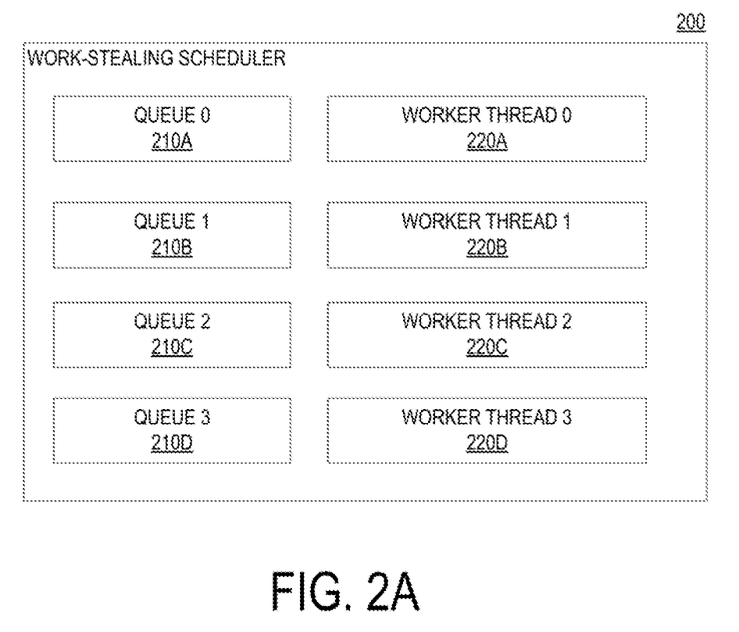
FIG. 2A is a diagram of an example of a work-stealing scheduler, according to aspects of the disclosure.

FIG. 1 is a diagram of an example of a computing system 100, according to aspects of the disclosure. The computing system 100 may include a central processing unit (CPU) 109, a graphics processing unit (GPU) 120, a memory 130, and a shared memory 140. The CPU 109 may include any suitable type of processor, such as an x86 processor, a reduced instruction set computer (RISC) processor, an ARM-based processor, etc. According to the present example, the CPU 109 includes a plurality of CPU cores 110A-110D, which are arranged to execute, in parallel, different worker threads 220 of a work-stealing scheduler 200 (shown in FIG. 2). Although in the example of FIG. 1, the CPU 109 has four CPU cores, alternative implementations are possible in which the CPU has any number of cores (e.g., 1, 8, etc.)

The GPU 120 may include any suitable type of graphics processing unit with the ability to directly map a memory range from the address space of the CPU 109 to the address space of the GPU 120, so that a single virtual address space is shared. In some implementations, the GPU 120 may include a GPU that supports the Compute Unified Device Architecture (CUDA) framework. Additionally or alternatively, in some implementations, the GPU 120 may include a GPU that supports the Open Computing Language (OpenCL) framework. The GPU 120 may include a plurality of GPU cores. According to the present example, the GPU 120 includes 1024 GPU cores, however it will be understood the present disclosure is not limited to any specific number of GPU cores 132 being provided on the GPU 120.

The memory 130 may include any suitable type of random-access memory (RAM), such as a Double Data Rate Synchronous Dynamic Random-Access Memory (DDR SDRAM) for example. The shared memory 140 may include a portion of the memory 130 that is mapped to the memory space of the GPU 120, respectively. Because the shared memory 140 is mapped to the memory space of the GPU 120, each of the CPU 109 and the GPU 120 may access the shared memory 140 directly. By way of example, in some implementations, the shared memory 140 may be mapped to the memory space of the GPU 120 by using the CUDA framework or the OpenCL framework. In some implementations, the GPU 120 may be arranged to accept a pointer to the shared memory 140 and use this pointer to directly reference the shared memory 140 from within the GPU kernel. Similarly, at least some of the CPU cores 110 may also be arranged to use the pointer to directly reference the shared memory 140.

FIG. 2A is a diagram of an example of a work-stealing scheduler 200 that is executed on the CPU 109. The work-stealing scheduler 200 may be part of any suitable type of parallel-computing software and/or microcode. The work-stealing scheduler 200 may include a plurality of queues 210 and a plurality of worker threads 220. Each of the worker threads 220 may be associated with a different queue 210. According to the present example, worker thread 220A is associated with queue 210A; worker thread 220B is associated with queue 210B; worker thread 220C is associated with queue 210C; and worker thread 220D is associated with queue 210D. As is discussed further below with respect to FIG. 2B, the queues 210 are used by the threads 220 to store and retrieve tasks. According to the example of FIG. 2A, each of the queues 210 is a double-ended queue. However, alternative implementations are possible in which another type of queue and/or another type of data structure for storing tasks. Although in the present example the work-stealing scheduler 200 is implemented in software, alternative implementations are possible in which the work-stealing scheduler 200 is implemented in hardware and/or as a combination of software (or microcode) or hardware.

Figure 2B:
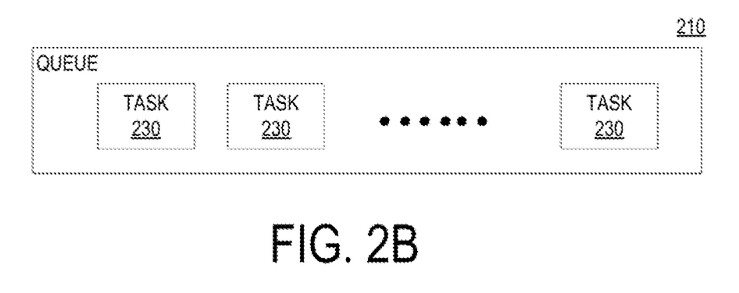
FIG. 2B is a diagram of an example of a queue that is used by the work-stealing scheduler of FIG. 2A, according to aspects of the disclosure.

FIG. 2B is a diagram of a queue 210, according to aspects of the disclosure. As the numbering suggests, the queue 210 may be the same or similar to any of the queues 210A-B, which are part of the work-stealing scheduler 200. As illustrated, the queue 210 may be arranged to store one or more tasks. Each of the tasks may represent a particular operation that is desired to be performed. Together the tasks in the queue 210 may be part of a Direct Acyclic Graph (DAG) for a particular action that is being executed via a parallel-computing algorithm implemented by the work-stealing scheduler 200. As used throughout the disclosure, and depending on the context, the term "task" may refer to either an operation or a descriptor corresponding to the operation. For example, in some implementations, the term "task" may refer to any suitable type of data that is necessary for executing an operation. By way of example, a "task" may include one or more of an opcode corresponding to the operation, input parameters for executing the operation, arguments to function calls that are associated with the operation, pointers to other data that needs to be referenced in order for the operation to be executed, and/or any other suitable type of data that is needed for executing the operation.

Figure 3A:
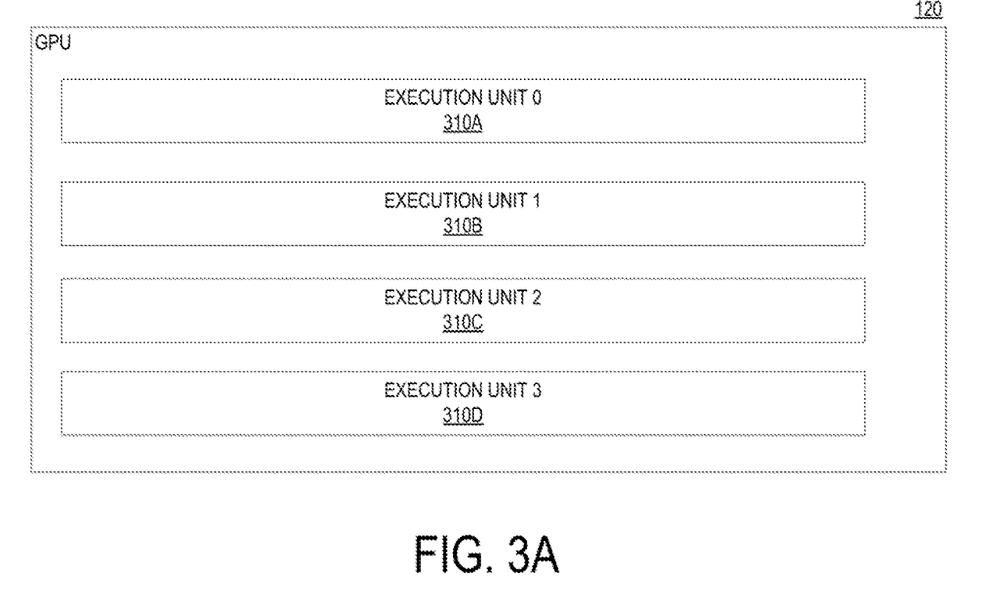
FIG. 3A is a diagram of an example of a graphics processing unit (GPU), according to aspects of the disclosure.

FIG. 3A is a diagram of an example of a logical organization of the GPU 120, according to aspects of the disclosure. According to the present example, the GPU 300 is arranged to execute an execution unit (or tile) 310A, an execution unit (or tile) 310B, an execution unit 310C (or tile), and an execution unit (or tile) 310D. Although in the example of FIG. 3A, the GPU 120 is arranged to implement four execution units, it will be understood that the present disclosure is not limited to implementing any specific number of execution units on the GPU 120. In some implementations, any of the execution units 310 may include what is known as a "block" or "wrap" in the NVIDIA CUDA (TM) framework. In some implementations, each execution unit 310 may include a hardware barrier mechanism for the GPU cores in the execution unit to use as a synchronization point. An example of execution units that can be used in accordance with the principles and ideas of the present disclosure can be found in U.S. patent application 16/372,618, titled ACCELERATING DATAFLOW SIGNAL PROCESSING APPLICATIONS ACROSS HETEROGENEOUS CPU/GPU SYSTEMS, which is herein incorporated by reference in its entirety.

Figure 3B:
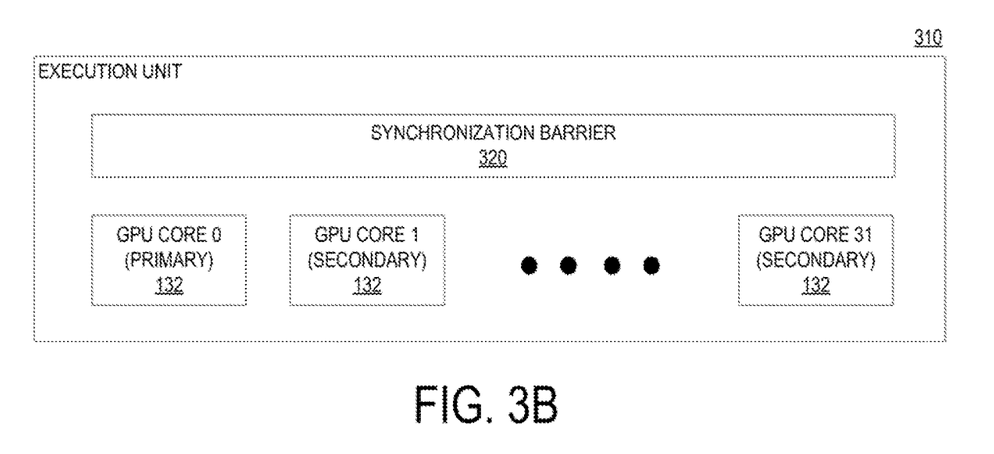
FIG. 3B is a diagram of an example of an execution unit that is part of the GPU of FIG. 3A, according to aspects of the disclosure.

FIG. 3B is a diagram of an example of an execution unit 310, according to aspects of the disclosure. As the numbering suggests, the execution unit 310 may be the same or similar to any of the execution units 310A-D, which are discussed above with respect to FIG. 3A. As illustrated in FIG. 3B, the execution unit 310 may include a set of GPU cores 132, and a synchronization barrier 320 that is shared among all of the GPU cores 132 in the set. According to the present example, the execution unit 310 includes 32 GPU cores 132, however alternative implementations are possible in which the execution unit 310 includes any number of GPU cores 132 (e.g., 1, 4, 8, 16, 64, etc.) Although in the example of FIG. 3B the execution unit 310 includes a synchronization barrier, alternative implementations are possible in which another type of synchronization mechanism is used instead. Stated succinctly, the present disclosure is not limited to any specific type of synchronization mechanism being in the execution unit 310.

The execution unit 310 may be used to execute tasks on behalf of the worker threads 220 in the work-stealing scheduler 200. One of the GPU cores 132 in the execution unit 310 may be assigned a primary status and is herein referred to as a "primary GPU core of the execution unit 310." For example, in some implementations, the GPU core (in the execution unit 310) having a rank of '0' may be designated as the primary GPU core of the execution unit 310. All remaining GPU cores 132 in the execution unit 310 may be assigned a secondary status, and are herein referred to as "secondary GPU cores of the execution unit 310." The primary GPU core 132 of the execution unit 310 may be arranged to: (i) obtain a task from a given one of the worker threads 220, (ii) divide the task into task portions, (iii) execute one of the task portions and provide the remaining task portions to the secondary GPU cores, and (iv) notify the worker thread when the task is completed.

In one particular example, the synchronization barrier 320 may be implemented in hardware, and it may be arranged to serve as a shared synchronization point among the GPU cores 132 in the execution unit 310. More particularly, the synchronization barrier 320 may cause each of the GPU cores 132 (e.g., each of the secondary GPU cores 320 and/or the primary GPU core 132) to enter a waiting state after it has finished executing its respective task portion and arrived at the barrier 320. Entering into a waiting state may effectively prevent the GPU core 132 from beginning to execute a portion of a next task right away, and potentially overwriting a task register where completion data for the current task is being stored (e.g., see task register 430, which is shown in FIG. 4B) prior to the completion data for the current task being retrieved by one of the worker threads 220. Although in the present example the synchronization barrier 320 is implemented in hardware, alternative implementations are possible in which the synchronization barrier 320 is implemented in software or as a combination of hardware and software. Stated succinctly, the present disclosure is not limited to any specific implementation of the synchronization barrier 320.

Figure 4A:
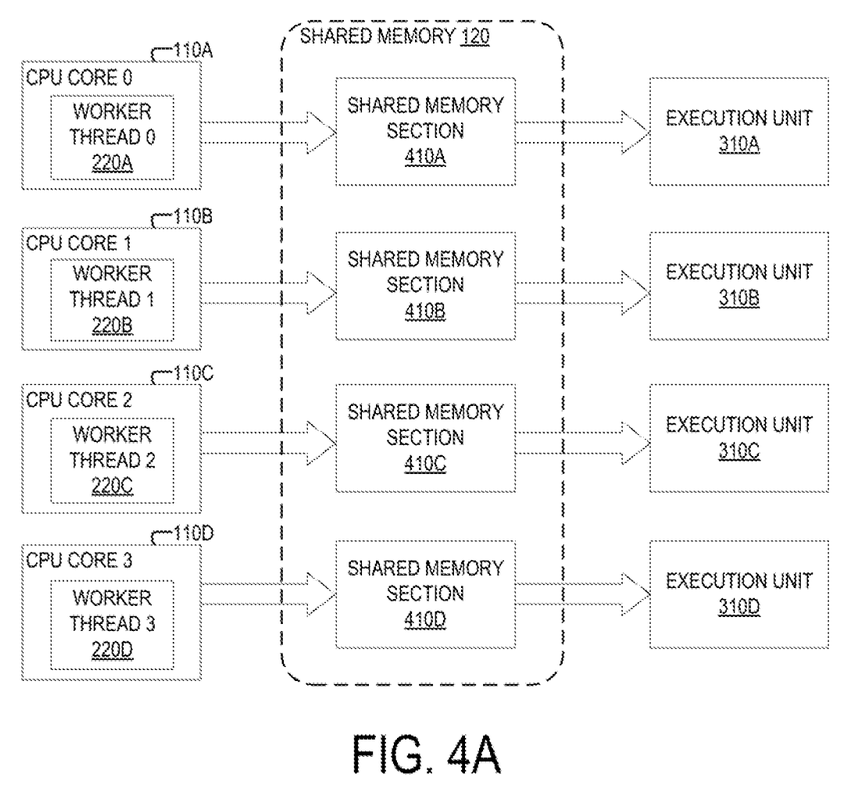
FIG. 4A is a diagram illustrating the operation of the work stealing scheduler of FIG. 2A, according to aspects of the disclosure.
Figure 4B:
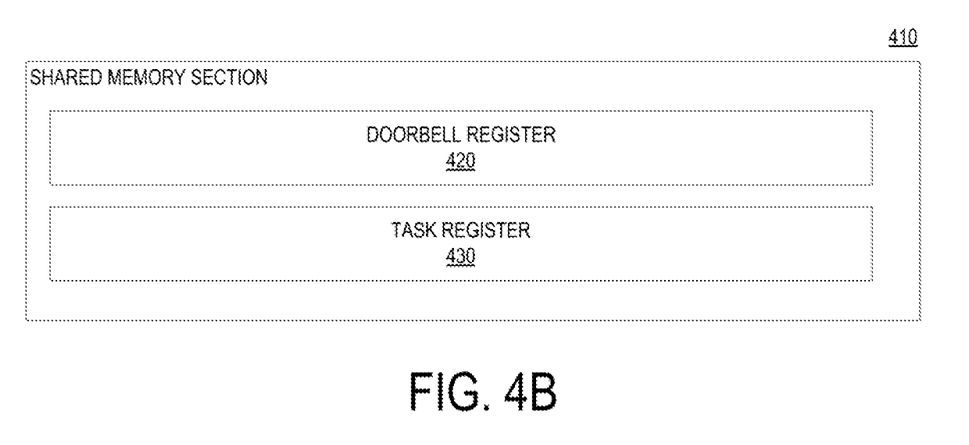
FIG. 4B is a diagram of an example of a shared memory section, according to aspects of the disclosure.

FIG. 4A is a schematic diagram illustrating the operation of the computing system 100, according to aspects of the disclosure. According to aspects of the disclosure, the shared memory is divided into M sections 410, where M is a positive integer that is equal to the number of execution units 310 that have been allocated to the work-stealing scheduler 200 (i.e., four in the present example). The shared memory sections 410 may be used to exchange data between respective worker threads 220 and respective execution units 310. As illustrated in FIG. 4B, each of the sections 410 includes a doorbell register and a task register 430. The doorbell register 420 may be one word wide, and it may be used to signal when a task has been stored in the task register 430. The task register 430 may be configured to store a particular task. As noted above, the term "task", as used throughout the present disclosure, may refer to any data that is necessary for an execution unit to perform on operation. For example, a "task" that is stored in the task register 230 may include one or more of an opcode associated with a particular operation, input parameters for executing the operation, arguments to function calls that are associated with the operation, pointers to other data that needs to be referenced in order for the operation to be executed.

Returning to FIG. 4A, each of the execution units 310 may be allocated a respective one of the shared memory section 410. More specifically, the execution unit 310A may be allocated a shared memory section 410A, which is used by the execution unit 310A to send and receive data from the CPU core 110A (and/or the worker thread 220A). The execution unit 310B may be allocated a shared memory section 410B, which is used by the execution unit 310B to send and receive data from the CPU core 110B (and/or the worker thread 220B). The execution unit 310C may be allocated a shared memory section 410C, which is used by the execution unit 310C to send and receive data from the CPU core 110C (and/or the worker thread 220C). And the execution unit 310D may be allocated a shared memory section 410D, which is used by the execution unit 310 to send and receive data from the CPU core 110D (and/or the worker thread 220D).

Furthermore, each of the CPU cores 110 (and/or each of the worker threads 220) may be allocated a respective one of the shared memory sections 410. More specifically, the CPU core 110A (and/or worker thread 220A) may be allocated a shared memory section 410A, which is used by the CPU core 110A (and/or the worker thread 220A) to send or receive data from the execution unit 310A. The CPU core 110B (and/or worker thread 220B) may be allocated a shared memory section 410B, which is used by the CPU core 110B (and/or the worker thread 220B) to send or receive data from the execution unit 310B. The CPU core 110C (and/or worker thread 220C) may be allocated a shared memory section 410C, which is used by the CPU core 110C (and/or the worker thread 220C) to send or receive data from the execution unit 310C. And the CPU core 110D (and/or worker thread 220D) may be allocated a shared memory section 410D, which is used by the CPU core 110D (and/or the worker thread 220D) to send or receive data from the execution unit 310D.

Each of the CPU cores 110 (and/or each of the worker threads 220) may be mapped to a respective execution unit 310. According to the example of FIG. 410A, the CPU core 110A (and/or worker thread 220A) is mapped to the execution unit 310A; the CPU core 110B and/or worker thread 220B) is mapped to the execution unit 310B; the CPU core 110C and/or worker thread 220C) is mapped to the execution unit 310C; and the CPU core 110D (and/or worker thread 220A) is mapped to the execution unit 310D. The mapping between any of the CPU cores 110 and a corresponding execution unit may be achieved by allocating the same shared memory section 410 to the CPU core and the corresponding execution unit 310. However, it will be understood that the present disclosure is not limited to any specific method for mapping CPU cores to respective execution units.

In some implementations, each of the CPU cores 110 (and/or worker threads 220) may execute tasks on the execution units 310 that are mapped to that the CPU core 110 and/or worker thread 220. For example, CPU core 110A (and/or worker thread 220A) may execute tasks on the execution unit 310A; CPU core 110B (and/or worker thread 220B) may execute tasks on the execution unit 310B; CPU core 110C (and/or worker thread 220C) may execute tasks on the execution unit 310C; and CPU core 110D (and/or worker thread 220D) may execute tasks on the execution unit 310D. For example, when any given one of the worker threads 220 detects that a sequential cutoff condition for a task is satisfied, the given worker thread 220 may identify a respective execution unit 310 that is mapped to the given worker thread 220. Next, the given worker thread 220 may provide the task to the respective execution unit 310 by using the shared memory section 410 that is allocated to both the given worker thread 220 and the respective execution unit 310. Next, the respective execution unit 310 retrieve the task from the shared memory section 410. Next, the respective execution unit 310 may execute the task and place data that is generated as a result of executing the task back into the shared memory section 410. And finally, the given worker thread may retrieve the data that is generated as a result of executing the task from the shared memory section.

Although in the example of FIG. 4A each of the CPU cores 110 (and/or worker threads 220) is allocated a single shared memory section 410, alternative implementations are possible in which any of the CPU cores 110 is allocated multiple shared memory sections 410. Although in the example of FIG. 4B each of the CPU cores 110 (and/or worker thread 220) is mapped to a single execution unit 310, alternative implementations are possible in which any of the CPU cores 110 (and/or worker threads 220) is mapped to multiple execution units. In such implementations, each of the CPU cores 110 (and/or worker threads) may be mapped to the same number of execution units 310. If the number of execution units 310 does not divide evenly by the number of CPU cores 110 (and/or worker threads 220), one of the CPU cores 110 (and/or worker threads 220) may be mapped to fewer execution units 310.

Figure 5A:
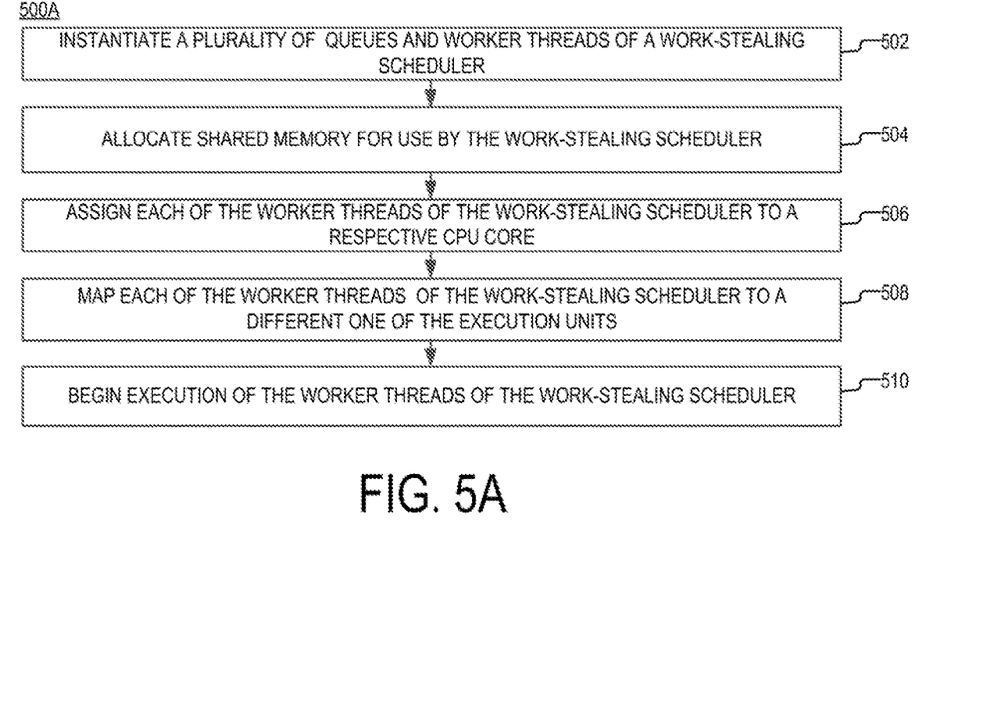
FIG. 5A is a flowchart of an example of a process, according to aspects of the disclosure.

FIG. 5A is a flowchart of an example of a process 500A for starting the operation of the work-stealing scheduler 200, according to aspects of the disclosure. According to the present example, the process 500A is performed by the CPU core 110A. However, alternative implementations are possible in which the process 500A is performed by another one of the CPU cores 110.

At step 502, CPU core 110A instantiates the queues 210 and the worker threads 220 of the work-stealing scheduler 200. At step 504, the CPU core 110A allocates the shared memory 140 and the plurality of shared memory sections 410 within the shared memory 140. At step 506, the CPU core 110A assigns each of the worker threads 220A to a different one of the CPU cores 110 of the CPU 109. As noted above, as a result of executing step 506, the worker thread 220A is assigned to the CPU core 110A, the worker thread 220B is assigned to the CPU core 110B, the worker thread 220C is assigned to the CPU core 110C, and the worker thread 220D is assigned to the CPU core 110D. At step 508, the core 110A maps each of the worker threads 220 to a respective one of the execution units 310. As noted above, as a result of executing step 508, the worker thread 220A (and/or CPU core 110A) is mapped to execution unit 310A. The worker thread 220B (and/or CPU core 110B) is mapped to execution unit 310B. The worker thread 220C (and/or CPU core 110C) is mapped to execution unit 310C. And the worker thread 220D (and/or CPU core 110D) is mapped to execution unit 310D. In some implementations, the mapping between any of the worker threads 220 and any execution unit 310 can be performed by assigning the same shared memory section 410 to the worker thread 220 and the execution unit 310. At step 510, the CPU core 110A begins execution the worker threads 220. In some implementations, any of the worker threads 220 may be executed according to a process 500B, which is discussed further below with respect to FIG. 5B.

Figure 5B:
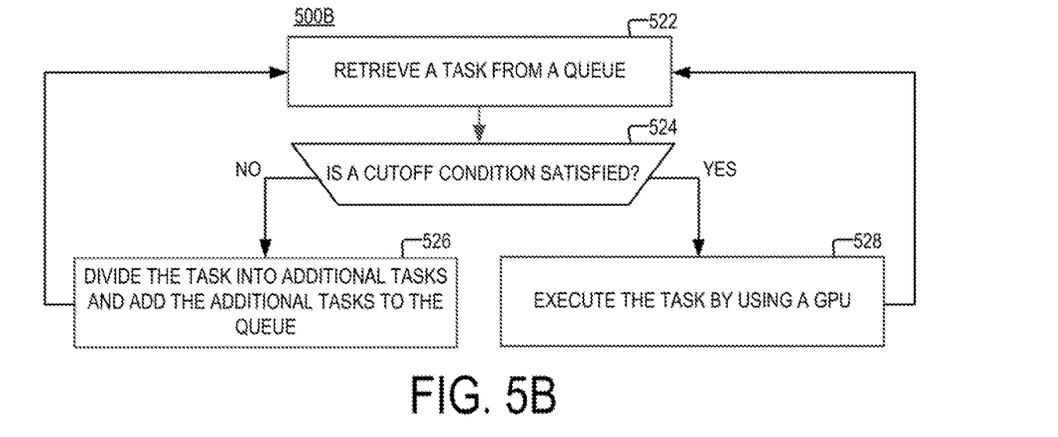
FIG. 5B is a flowchart of an example of a process, according to aspects of the disclosure.
Figure 6A:
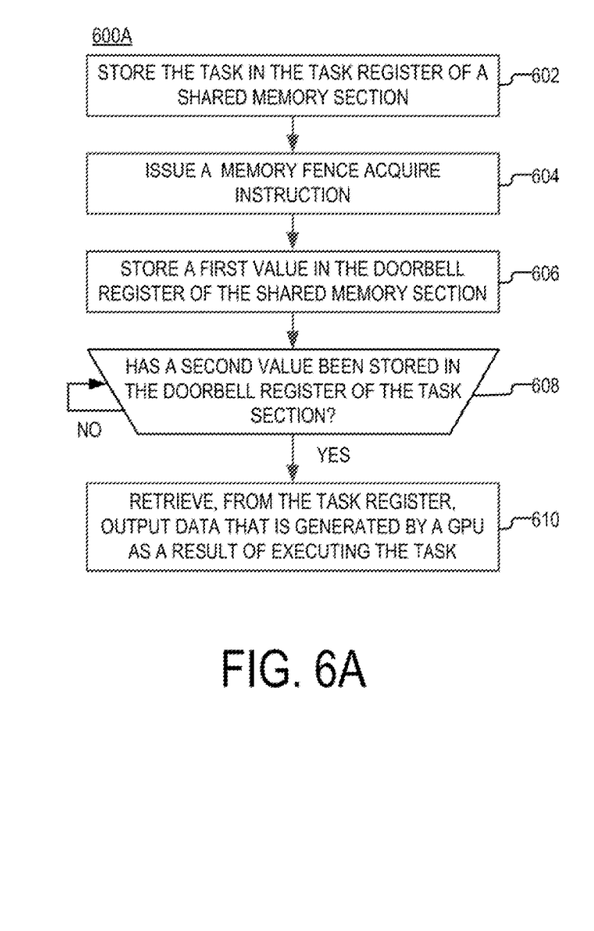
FIG. 6A is a flowchart of an example of a process, according to aspects of the disclosure.
Figure 6B:
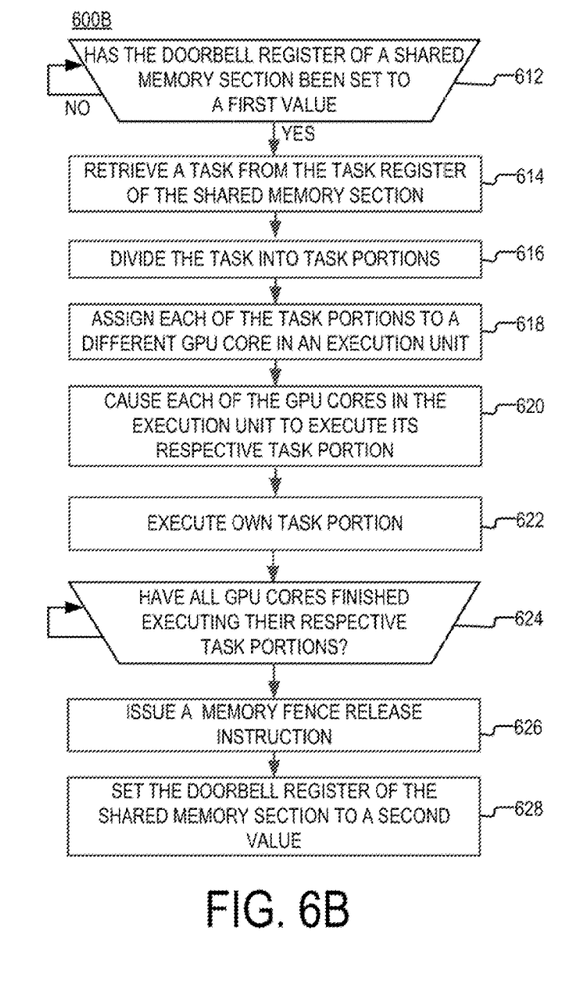
FIG. 6B is a flowchart of an example of a process, according to aspects of the disclosure.

FIG. 5B is a flowchart of an example of a process 500B for executing a worker thread of a work-stealing scheduler as specified by step 510 of the process 500A, according to aspects of the disclosure. According to the example of FIG. 5B, the process 500B is performed by the worker thread 220A, however alternative it will be understood that the process 500B can be performed by any of the worker threads 220. At step 522, the worker thread 220A retrieves (and/or removes) a task from the queue 210A. At step 524, the worker thread 220A determines whether a predetermined cutoff condition is satisfied. If the condition is satisfied, the process 500B proceeds to step 526. Otherwise, if the condition is not satisfied, the process 500B proceeds to step 528. At step 526, the process 500B divides the task into additional tasks and adds the tasks back to the queue 210A. At step 528, the worker thread 220A executes the task by using the execution unit 310A of the GPU 120. The manner in which the task is executed is discussed further below with respect to FIGS. 6A-C. Specifically, FIG. 6A provides an example of a process that is performed by the worker thread 220A for the purpose of executing the task on the execution unit 310A. FIG. 6B provides an example of a process 600B that is performed by the primary GPU core of the execution unit 310A for the purpose of coordinating the execution of different portions of the task. And FIG. 6C provides an example of a process 600C that is performed by any of the primary GPU core and the secondary GPU cores in the execution unit 310A for the purpose of executing the task portions.

FIG. 6A is a flowchart of a processes 600A for executing a task by using a GPU, as specified by step 528 of the process 500B. At step 602, the worker thread 220A stores a task (e.g., the task retrieved at step 522) in the task register 430 of the shared memory section 410A. At step 604, the worker thread 220A issues a memory fence acquire instruction. At step 606, the worker thread 220A stores a first value (e.g., '1') in the doorbell register 420 of the shared memory section 410A. As is discussed further below with respect to FIG. 6B, storing the first value in the doorbell register 420 effectively notifies the execution unit 310A that there is a task in the task register 430 that is waiting to be executed. At step 608, the worker thread 220A detects whether the doorbell register 420 of the shared memory section 410A is set to a second value (e.g., '0'). If the doorbell register 420 is set to the second value, the process 600A proceeds to step 610. Otherwise, if the doorbell register 420 is not set to the second value, step 608 is executed again. In other words, at step 606, the worker thread 220A waits until the doorbell register 420 is set to the second value (by the execution unit 310A) before proceeding to step 610. As is discussed further below with respect to FIG. 6B, when the doorbell register 420 is set to the second value, this effectively notifies the worker thread 220A that the task has been completed by the execution unit 310A. At step 610, the worker thread 220A retrieves, from the task register 430 of the shared memory section 410A, a completion status word (and/or an error code) that has been stored there by one or more GPU cores in the execution unit 310A.

FIG. 6B is a flowchart of an example of a process 600B for executing a task as specified by step 528 of the process 500B. At step 612, the primary GPU core of the execution unit 310A detects whether the doorbell register 420 of the shared memory section 410A has been set to the first value. If the doorbell register 420 is set to the first value, the process 600B proceeds to step 614. Otherwise, step 612 is repeated again. At step 614, the primary GPU core of the execution unit 310A retrieves the task from the task register 430 of the shared memory section 410A. At step 616, the primary GPU core of the execution unit 310A divides the task into a plurality of task portions. At step 618, the primary GPU core of the execution unit 310A assigns each of the plurality of task portions to a different one of the GPU cores in the execution unit 310A. For example, the primary GPU core may assign a respective task portion to itself and to each of the secondary GPU cores in the execution unit 310A. Alternatively, when there are fewer task portions than there are GPU cores in the execution unit 310A, the primary GPU core 310A may assign respective task portions to only some of the GPU cores in the execution unit 310A. At step 620, the primary GPU core 132 of the execution unit 310A causes each of the secondary GPU cores 132 in the execution unit 310 (that has been assigned a task portion) to begin executing its respective task portion. At step 622, the primary GPU core 132 executes a task portion that it has assigned to itself. As can be readily appreciated, in some implementations, the primary GPU core 132 may not assign a task portion to itself, in which case step 622 can be omitted. At step 622, the primary GPU core of the execution unit 310A detects whether each of the GPU cores in the execution unit 310A (which have been assigned a task portion) has finished executing its respective task portion. For example, detecting whether each of the GPU cores has finished executing its respective task portion may include detecting whether each of the GPU cores has arrived at the synchronization barrier 320 of the execution unit 310A and is currently in a waiting state. If each of the GPU cores has finished executing its respective task portion, the process 600B proceeds to step 626. Otherwise, step 624 is repeated. At step 626, the primary GPU core of the execution unit 310A issues a memory fence release instruction. At step 628, the primary GPU core of the execution unit 310A sets the doorbell register 420 of the shared memory section 410A to the second value (e.g. '0').

Figure 6C:
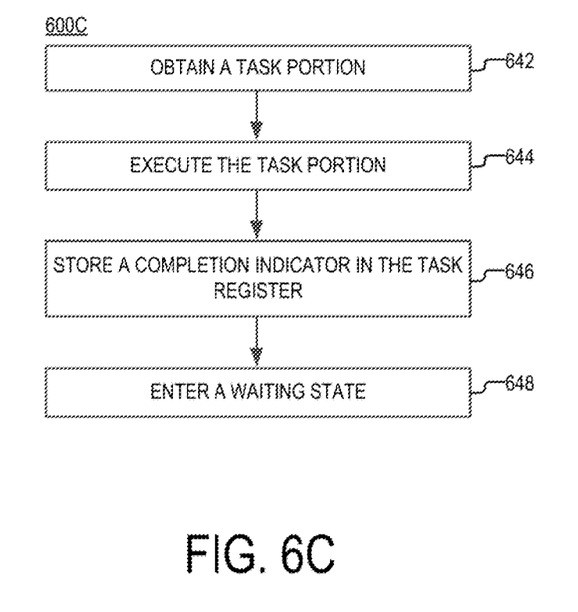
FIG. 6C is a flowchart of an example of a process, according to aspects of the disclosure.

FIG. 6C is a flowchart of an example of a process 600B for executing a task as specified by step 506 of the process 500B. At step 642, the GPU core 132 of the execution unit 310A obtains one of the task portions (assigned at step 618). At step 644, the GPU core 132 executes the task portion. At step 646, the GPU core 132 stores a completion indicator in the task register of the shared memory section 410A. For example, if the GPU core 132 has executed the task successfully, the GPU core 132 may set one of the bits in the task register of memory section 410 section to '1'. As another example, if the GPU core 132 has failed to execute the task successfully, the GPU core 132 may set the same bit to '0'. Additionally or alternatively, in some implementations, when the GPU core 132 has failed to execute the task successfully, the GPU core 132 may store an error code in the task register that identifies a reason for the task portion not being able to complete successfully. Although in the present example the completion indicator is 1-bit wide, alternative implementations are possible in which the completion status indicator has a larger size. At task 648, the GPU core 132 enters a waiting state as a result of reaching the barrier synchronization barrier 320 of the execution unit 310A.

In some implementations, when a task is completed, a word may be stored in the task register 430 (of the shared memory section 410A) that identifies a completion status of the task. The word may include a plurality of bits. Each of the bits may be stored in the task register by a different GPU core in an execution unit 310, and it may indicate whether the GPU core has completed successfully a portion of the task that has been executed by the GPU core. If the bit is equal for '1', this may indicate that the GPU core has completed successfully its portion of the task. Otherwise, if the bit is set to '0', this may indicate that the GPU core has failed to complete its portion of the task. So, when the word includes all '1s', this may indicate that the task has been completed successfully by the execution unit 310. By contrast, when the word contains at least one '0', this may indicate that the task could not be completed successfully by the execution unit 310. Although FIGS. 1-6C show the shared memory section 410A as the only memory that is shared between the execution unit 310A and the worker thread 220A, alternative implementations are possible in which additional memory is shared between the execution unit 310A and the worker thread 220A, which is used for providing results data to the worker thread 220A.

According to aspects of the disclosure, the memory fence acquire and memory fence release instructions may be barrier instructions that cause the CPU 109 (and/or a compiler running on the CPU 109) to enforce the ordering in which data is stored in the doorbell register 420 and the task register 430 of the shared memory 410. Specifically, issuing an acquire memory fence instruction at step 604 ensures that the task would be stored in the task register 430 of the shared memory section 410A (at step 602) before the first value is stored in the doorbell register 420 of the shared memory section 410A (at step 606). Similarly, issuing a memory fence release instruction at step 626 ensures that all completion data that is associated with a task would be copied into the task register 430 of the shared memory section 410A (at step 624) before the doorbell register 420 of the shared memory section 410A is set to the second value (at step 632). According to the present disclosure, it has been observed that using memory fence instructions (as opposed to atomic operations) to synchronize writing to the doorbell and task registers (of a shared memory section 410) can greatly reduce the overhead of the protocol (described with respect to FIGS. 6A-C) and improve the efficiency at which the task (obtained at step 614) is executed.

In some implementations, when a memory fence instruction has been issued, seeing a first value (e.g., '1') in the doorbell register 420 of the shared memory section 410A may guarantee to the execution unit 310A that a valid task is present in the task register 430 of the memory section 410. Similarly, when a memory fence release instruction is issued, seeing a second value (e.g., '0') in the doorbell register 420 of the shared memory section 410A may guarantee to the CPU core 110A (and/or worker thread 220A) that a valid task is present in the task register 430 of the memory section 410. In some implementations, when the CPU core 110A (and/or worker thread 220A) is mapped to multiple execution units 310, the CPU core 110A (and/or worker thread 220A) may divide the task (obtained at step 522) into a plurality of tasks (e.g., task portions), and execute each task portion with a different one of the executions units 310 (in the manner discussed with respect to FIG. 6A).

According to the example of FIGS. 5B and 6A, at step 522, a task is retrieved from the queue 210A, and, at step 602, the task is stored in the task register of the shared memory section 410A. However, steps 522 and 602 do not necessarily imply that the same data that is retrieved from the queue 210A is also stored in the task register 430 of the shared memory section 410A. For example, in some implementations, one or more first data items may be retrieved from the queue 210A (at step 522), and one or more second data items may be stored in the task register 430 (at step 602). In such implementations, the second data items may be identical or different to the first data items. Additionally or alternatively, in some implementations, at least one of the second data items may be at least in part generated based on the first data items.

In some implementations, the work-stealing scheduler 200 may disconnect one or more of the execution units 310 by placing a "disconnect" opcode in the task register 430 of that execution unit 310. Upon receiving the "disconnect" opcode, the primary GPU 132 of the execution unit (and/or other hardware in the GPU 120) may dissociate the execution unit from the work-stealing scheduler 200.

The present disclosure is not limited to using any specific parallel-processing algorithm in the work-stealing scheduler 200. In this regard, it will be understood that the present disclosure is not limited to evaluating any specific cutoff condition (at step 524). Although the example of FIGS. 1-6C is presented in the context of work-stealing schedulers, the present disclosure is not limited to any specific type of scheduler.

The processes described herein are not limited to use with hardware and software of FIG. 1; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A method for use in a computing system having a central processing unit (CPU) and a graphics processing unit (GPU), the method comprising:
   assigning a first memory portion and a second memory portion to: (i) a worker thread of a work-stealing scheduler that is executed on the CPU and (ii) an execution unit that is part of the GPU;
   retrieving a task from a queue associated with the worker thread;
   detecting, by the worker thread, whether a cutoff condition for the task is satisfied;
   when the cutoff condition is not satisfied, dividing the task into two or more additional tasks and adding the two or more additional tasks to the queue;
   when the cutoff condition is satisfied, storing first data corresponding to the task in the second memory portion, the first data being stored in the second memory portion by the worker thread;
   issuing a memory fence acquire instruction after the first data is stored in the second memory portion; and
   storing a first value in the first memory portion, the first value being stored by the worker thread after the memory fence acquire instruction is issued,
   wherein storing the first value in the first memory portion causes the execution unit to retrieve the first data from second memory portion and execute the task based on the first data.

2. The method of claim 1, wherein the first memory portion includes a doorbell register, and the second memory portion includes a task register.

3. The method of claim 1, wherein the execution unit includes a plurality of GPU cores and a synchronization mechanism that is shared among the plurality of GPU cores.

4. The method of claim 1, wherein the first data includes one or more of an opcode corresponding to the task and an argument for executing the task.

5. The method of claim 1, further comprising detecting that the task is completed when a second value is stored in the first memory portion by the execution unit, the detecting being performed by the worker thread.

6. The method of claim 1, further comprising retrieving, from the second memory portion, second data that is generated, by the execution unit, as a result of executing the task, the second data being retrieved, by the worker thread, in response to detecting that a second value has been stored in the first memory portion by the execution unit.

7. The method of claim 1, further comprising:
retrieving the first data from the second memory portion, the first data being retrieved by the execution unit in response to detecting that the first value has been stored in the first memory portion by the worker thread; and
executing the task, the task being executed by the execution unit based on the first data.

8. The method of claim 7, further comprising:
storing, in the second memory portion, second data that is generated by the execution unit as a result of executing the task;
issuing a memory fence release instruction after the second data is stored in the second memory portion; and
storing a second value in the first memory portion that indicates that the task is completed, the second value being stored by the execution unit after the memory fence release instruction is issued.

9. A system, comprising:
a graphics processing unit (GPU) having an execution unit;
a random-access memory having a first memory portion and a second memory portion;
a central processing unit (CPU) that is configured to execute a work-stealing scheduler, the work-stealing scheduler having a worker thread that is configured to perform the operations of:
retrieving a task from a queue associated with the worker thread;
detecting whether a cutoff condition for the task is satisfied;
when the cutoff condition is not satisfied, dividing the task into two or more additional tasks and adding the two or more additional tasks to the queue;
when the cutoff condition is satisfied, storing first data corresponding to the task in the second memory portion;
issuing a memory fence acquire instruction after the first data is stored in the second memory portion; and
storing a first value in the first memory portion after the memory fence acquire instruction is issued,
wherein storing the first value in the first memory portion causes the execution unit to retrieve the first data from second memory portion and execute the task based on the first data.

10. The system of claim 9, wherein the first memory portion includes a doorbell register, and the second memory portion includes a task register.

11. The system of claim 9, wherein the execution unit includes a plurality of GPU cores and a synchronization mechanism that is shared among the plurality of GPU cores.

12. The system of claim 9, wherein the first data includes one or more of an opcode corresponding to the task and an argument for executing the task.

13. The system of claim 9, wherein the worker thread is further configured to perform the operation of detecting that the task is completed when a second value is stored in the first memory portion by the execution unit.

14. The system of claim 9, wherein the worker thread is further configured to perform the operation of retrieving, from the second memory portion, second data that is generated as a result of executing the task, the second data being retrieved in response to detecting that a second value has been stored in the first memory portion by the execution unit.

15. The system of claim 9, wherein the execution unit is configured to perform the operations of:
retrieving the first data from the second memory portion, the first data being retrieved by in response to detecting that the first value has been stored in the first memory portion by the worker thread; and
executing the task based on the first data.

16. The system of claim 15, wherein the execution unit is further configured to perform the operations of:
storing, in the second memory portion, second data that is generated by the execution unit as a result of executing the task;
issuing a memory fence release instruction after the second data is stored in the second memory portion; and
storing a second value in the first memory portion that indicates that the task is completed, the second value being stored after the release memory fence instruction is issued.

17. A non-transitory computer-readable medium that is configured to store one or more processor executable instructions, which, when processed by at least one processor, cause the processor to execute a work-stealing scheduler having a worker thread, the worker thread being arranged to share a first memory portion and a second memory portion with an execution unit that is part of a graphics processing unit (GPU), the worker thread being arranged to perform the operations of:
retrieving a task from a queue associated with the worker thread;
detecting whether a cutoff condition for the task is satisfied;
when the cutoff condition is not satisfied, dividing the task into two or more additional tasks and adding the two or more additional tasks to the queue;
when the cutoff condition is satisfied, storing first data corresponding to the task in the second memory portion;
issuing a memory fence acquire instruction after the first data is stored in the second memory portion;
storing a first value in the first memory portion after the memory fence acquire instruction is issued,
wherein storing the first value in the first memory portion causes the execution unit to retrieve the first data from second memory portion and execute the task based on the first data.

18. The non-transitory computer-readable medium of claim 17, wherein the first memory portion includes a doorbell register, and the second memory portion includes a task register.

19. The non-transitory computer-readable medium of claim 17, wherein the execution unit includes a plurality of GPU cores and a synchronization mechanism that is shared among the plurality of GPU cores.

20. The non-transitory computer-readable medium of claim 17, wherein the first data includes one or more of an opcode corresponding to the task and an argument for executing the task.

* * * * *